US005098165A

United States Patent [19]

Jacobs et al.

[11] Patent Number: 5,098,165

[45] **Date of Patent: * Mar. 24, 1992**

[54] GUIDED ROOFING MATERIALS REMOVAL APPARATUS

[76] Inventors: James L. Jacobs, 2031 A. Denais Rd., Duson, La. 70529; Larry D. Rogers, 113 W. Elm St., Onley, Tex. 76374

[*] Notice: The portion of the term of this patent subsequent to Nov. 14, 2006 has been disclaimed.

[21] Appl. No.: 435,936

[22] Filed: Nov. 14, 1989

Related U.S. Application Data

[63] Continuation-in-part of Ser. No. 227,070, Aug. 1, 1988, Pat. No. 4,880,491.

[51] Int. Cl.[5] ........................ E04D 15/02; B32B 31/18

[52] U.S. Cl. ........................................ 299/37; 30/170; 156/584; 173/24; 182/45; 248/237

[58] Field of Search .................... 299/37; 30/169, 170; 15/93.1; 156/584, 344; 81/45; 182/45, 102, 103; 248/237; 173/24

[56] References Cited

U.S. PATENT DOCUMENTS

| | | | |
|---|---|---|---|
| 710,281 | 9/1902 | Leek | 182/45 |
| 2,326,514 | 8/1943 | Bard | 262/13 |
| 2,519,138 | 8/1950 | Katz | 173/24 X |
| 2,565,841 | 8/1951 | Conforto | 173/24 X |
| 2,586,917 | 2/1952 | Conforto | 173/24 X |
| 3,251,629 | 5/1966 | Cawley | 173/24 X |
| 3,542,433 | 11/1970 | Probst et al. | 173/24 X |
| 3,563,608 | 2/1971 | Crispino | 299/36 |
| 3,628,833 | 12/1971 | Crispino | 299/36 |
| 3,666,054 | 5/1972 | Ellings et al. | 182/103 X |
| 3,695,713 | 10/1972 | Rothi et al. | 173/24 X |
| 3,726,565 | 4/1973 | Oliverius | 173/24 X |
| 3,779,605 | 12/1973 | Nieman | 299/37 |
| 4,091,535 | 5/1978 | Lehrter | 299/37 X |
| 4,277,104 | 7/1981 | Sanchez | 299/37 |
| 4,606,430 | 8/1986 | Roby et al. | 182/36 X |
| 4,607,724 | 8/1986 | Hillberg | 182/36 X |
| 4,640,735 | 2/1987 | Murray et al. | 156/584 |
| 4,673,219 | 6/1987 | Perciful | 299/36 X |
| 4,691,439 | 9/1987 | Marra | 299/36 X |
| 4,699,245 | 10/1987 | Benedet | 182/36 X |
| 4,699,430 | 10/1987 | Nichols | 30/170 X |
| 4,709,479 | 12/1987 | Lavelette | 30/170 |
| 4,756,578 | 7/1988 | Mims et al. | 30/170 X |
| 4,858,503 | 8/1989 | Dike, Jr. | 299/37 X |
| 4,880,491 | 11/1989 | Jacobs et al. | 299/37 X |
| 4,942,943 | 7/1990 | Flaherty | 248/237 X |

FOREIGN PATENT DOCUMENTS

| | | | |
|---|---|---|---|
| 1119801 | 7/1968 | United Kingdom | 182/103 |

*Primary Examiner*—David J. Bagnell
*Attorney, Agent, or Firm*—Pravel, Gambrell, Hewitt, Kimball & Krieger

[57] ABSTRACT

A roofing materials removal device provides a guide system which secures the device and the operator in position on an inclined roof so that the roof can be traversed at various positions along different travel paths while supported. The removal device comprises a light-weight, durable, wheel supported frame, dual handles for leverage, an electric motor positioned low on the frame to give the device balance and stability. An angled blade reciprocating and riding on linear bearings is connected to spring-mounted tension bars. As the springs force the rear end of the tension bar upward, the forward end of the tension bars pivot downward causing the serrated, leading edge of the blade to slide between the roof covering material and the roof deck. The blade follows the contour of the roof deck dislodging roofing material including nails, roofing felt and shingles. The guide system is positioned on the opposite side of the roof ridge from the removal device. The guide system comprises a track, a vertical support post assembly, a carrier which traverses the length of the track, and an adjustable support system which secures the machine frame and the operator to a desired position. An on-off ramp allows the roofing materials device to be moved to the desired position through the use of the guide system.

19 Claims, 11 Drawing Sheets

GUIDED ROOFING MATERIALS REMOVAL APPARATUS

CROSS REFERENCE TO RELATED APPLICATION

This is a continuation-in-part of copending U.S. Pat. Application Ser. No. 07/227,070, filed Aug. 1, 1988, now U.S. Pat. No. 4,880,491, and hereby incorporated by reference.

BACKGROUND OF THE INVENTION

The present invention relates to an improved device for removing roofing materials from a roof. The present invention more particularly relates to an improved, powered roofing materials removal apparatus which can safely and efficiently remove shingles, felt, nails and like roofing materials from flat or inclined roofs. Even more particularly, the present invention relates to a roofing materials removal apparatus having a guide system which secures the device and its operator on an inclined roof, while allowing lateral and horizontal movement needed to separate the roof covering from the underlying roof decking. An on-off ramp allows the device to be moved to the desired position through the use of the guide system.

Commercial roofing contractors generally utilize laborers using hand tools, such as flat head shovels and pry bars, to separate roof covering materials (e.g., shingles, felt, tar paper) from roof decking. This manual process is physically exhausting and time consuming. While hand tools are still the tools of choice for most commercial roofers, a number of devices for removing roofing materials designed to replace laborers have been patented.

Most prior art devices are difficult to get on and off a roof and typically have no means for being secured to the roof during operation. They have to be lifted or hoisted manually. Typically, the devices are large, bulky and are not feasible for use on conventionally-supported inclined roofs. Some prior art devices incorporate walking and riding tractors which are not easily maneuverable around vents, air conditioners and chimneys. Often such devices have high centers of gravity and shields which can accumulate the separated roofing materials. Top-heavy devices are difficult and hazardous to use on an inclined roof since they tend to slide down the roof or topple over and fall off the roof.

Many prior art devices are machine powered, for example, by gasoline engines. Gasoline engines create several potential problems in roofing applications. For example, gasoline engines having conventional carburetors are designed to operate on a generally flat surface since the needle in a carburetor is intended for vertical movement. If the engine is operated on an inclined surface for any length of time, the carburetor will not operate properly and the engine will miss or stop running. Gasoline engines periodically run out of fuel and have to be refilled. Gasoline spilled or dripping on a hot exhaust or moving blade poses a fire hazard. Gasoline engines are often noisy. This can create a hazard for an operator who is unable to hear a warning call over the noise of the engine.

Most of the prior art devices have blades positioned to slip under the roof covering to separate it from the roof decking. The position of the blade can impede the efficiency of the removal operations. For example, blades held in a rigid position will not closely follow the contour of the roof decking. On other devices, the weight of the machine is borne by the wheels and the blade. A blade forced into substantially continuous contact with the roof decking wears quickly, loses its power and thrust, and may damage the roof decking.

Some prior art devices have blades which sever nails rather than remove them. Severed nail parts must either be removed by hand or pounded flush with the roof decking so that they do not damage the replacement roof covering.

While some devices have blades which sever nails, other devices do not have enough power to remove all the nails. In such a situation, laborers must resort to hand tools to remove the nails.

Various prior art devices for removing roofing materials and the like, and for securing roofers to roofs, as well as the apparatus and the method of this construction in general, are known, and found to be exemplary of the following U.S. patents:

| U.S. Pat. No. | Inventor | U.S. Pat. No. | Inventor |
|---|---|---|---|
| 2,326,514 | Bard | 3,779,605 | Nieman |
| 2,519,138 | Katz | 4,091,535 | Lehrter |
| 2,565,841 | Conforto | 4,277,104 | Sanchez |
| 2,586,917 | Conforto | 4,606,430 | Roby |
| 3,251,629 | Cawley | 4,607,724 | Hillberg |
| 3,542,433 | Probst | 4,673,219 | Perciful |
| 3,563,608 | Crispino | 4,691,439 | Marra |
| 3,628,833 | Crispino | 4,699,245 | Benedet |
| 3,695,713 | Rothi et al | 4,699,430 | Nichols |
| 3,726,565 | Oliverius | 4,709,479 | Lavellete |

U.S. Pat. No. 2,326,514 to Bard discloses a roof scraper driven by an internal combustion motor. The device has an inclined impact tool for removing asphalt and gravel from a roof without damaging the underlying felt. It is not guided nor supported but rather simply tracks the roof upon its wheels. It also requires manual pushing for mobility.

U.S. Pat. No. 2,519,138 to Katz discloses a roofing machine to loosen and remove gravel from built up roofs and to sweep roof surfaces. It includes scrapers mounted on moving rods which can be positioned at various angles in order to accomodate roofs which vary in pitch and surfacing thickness.

U.S. Pat. No. 2,565,841 to Conforto discloses a variety of blades for a roofer's slag scraper. The blades are angled downwardly and projecting slightly forward with serrations along the leading edge of the blade.

U.S. Pat. No. 2,586,917 to Conforto discloses a lightweight motorized roofer's slag scraper having a single blade and a single reciprocating blade supporting arm. The blade support arm is connected to a piston which is slideably mounted in a cylinder. A single belt connects the cylinder to the means to reciprocate the piston.

U.S. Pat. No. 3,251,629 to Cawley discloses a motorized material stripping machine also having a single blade and a single, reciprocating blade supporting arm. Reciprocation of the blade support arm is achieved by a cam connected to the motor by a single belt.

U.S. Pat. No. 3,542,433 to Probst discloses a self-propelled gasoline powered tractor and roof removing attachment. The attachment comprises a plurality of frame members, each of which terminates in a sharpened head adopted to wedge under the roofing covering and pry up the roofing materials. The dislodged roofing materials are progressively moved up the inclined surface of the attachment so that it can be removed by workmen. A blade with a serrated leading edge can be attached to the heads to remove nails.

U.S. Pat. No. 3,563,608 to Crispino discloses an attachment for a riding tractor which can be used to remove roofing paper from a roof. The device consists of a tractor, a thrust distributor assembly and a fork assembly. The fork has a series of tapered teeth to break loose and remove roofing paper.

U.S. Pat. No. 3,628,833 to Crispino is a roof-ripping machine consisting of a tractor, a ripping head having a fork assembly and a hinged shield. The shield is to deflect the ripped up roofing materials and provide protection for the operator.

U.S. Pat. No. 3,695,713 to Rothi discloses a method for stripping roofs and a roof stripping machine that has a double-edged blade reciprocal along the path of advance of the roof stripper. The blade is located below the frame and to the rear of the tractor wheels. The roof stripper can be operated in forward and reverse at speeds independent of the blade reciprocation.

U.S. Pat. No. 3,726,565 to Oliverius discloses a material stripping machine including a movable carriage, a motor, a reciprocating blade and diverter means for diverting stripped material to either side of the carriage. The diverter means substantially covers the body of the carriage and has a pair of angularly disposed inclined surfaces sloping downwardly to opposite sides of the carriage.

U.S. Pat. No. 3,779,605 to Nieman discloses a roofing removal apparatus which may be attached to a walking tractor. The apparatus comprises a frame with slidable guide rods carrying a reciprocating cutting head and a drive shaft driven by the tractor to effect the reciprocating action.

U.S Pat. No. 4,091,535 to Lehrter discloses a motor driven shingle stripper comprising a housing with cutters at its forward end to cut nails and shingles. The rear of the housing is enclosed to collect the severed nails and shingles. The shingle stripper has a guide device which is removably mounted to the roof ridge. A cable extends from the guide device to the shingle stripper housing and allows the housing to move up the incline of the roof.

U.S. Pat. No. 4,277,104 to Sanchez is a power driven shingle remover with a reciprocating upward thrust blade. This device allows shingles to be removed without damage to underlying tar paper.

U.S Pat. No. 4,606,430 to Roby et al is a rail mounted safety restraint device which can travel freely along the length of the rail. The device includes a substantially U-shaped hood having a pair of hinged hood sections, each supporting upper and lower rollers for engagement respectively with the upper and lower surfaces of the ball of the rail. The device anchors one end of the cable to the rail and the other end to a safety harness to be worn by railway workers.

U.S. Pat. No. 4,607,724 issued to Hildberg discloses a safety apparatus for roofers which includes a boom pivotally connected to a rotatable stanchion. The stanchion is supported on the roof by a saddle adjustable to conform to the peak of the roof. A tether is connected at one end to the boom and the other end to the worker's safety belt.

U.S. Pat. No. 4,673,219 to Perciful discloses a power driven roofing removal tool having a plurality of rigid cutting teeth disposed about the outer surface of a cylindrical drum. When the teeth make physical contact with the shingles, the shingles are destroyed. The device has a kill switch on the handle which when released by the operator stops the motor.

U.S. Pat. No. 4,691,439 to Marra discloses a handheld, power driven roofing shingle remover. It is a shovel-like device with a blade that can be lowered to slide under shingles and raised to exert leverage under the shingles and raise nails from the roof decking.

U.S. Pat. No. 4,699,245 to Benedet discloses a safety device for workers working at great heights on, for example, ships, bridges, dams, roofs and scaffolding. The device comprises a cable stretched parallel to a direction of movement and carried by space supports and a hooking element sliding along the cable.

U.S Pat. No. 4,699,430 to Nichols discloses a material stripping apparatus having a lift blade that can both reciprocate and oscillate under shingles.

U.S. Pat. No. 4,709,479 to Lavelette discloses a shingle removing machine having a blade which is connected to piston controlled operating members. The piston rocks or pivots the operating members and the blade defining an eliptical path of movement under engaging shingles.

GENERAL DISCUSSION OF THE PRESENT INVENTION

The present invention provides an improved roofing material scraper apparatus and guide system which includes a track which defines a path along a roof ridge line and generally parallel thereto and adapted to be attached at the ridge line of the roof. The wheeled machine frame can thus traverse the roof along travel path lines which are generally parallel to and spaced from the track. The stripping blade is carried by the frame and is provided for removing roofing materials such as shingles, felt, and/or nails as the frame traverses the roof along the various travel path lines. The movable carriage is positioned for travel upon the track and carries with it an adjustable support which forms a connection between the carriage and the wheeled machine frame. With the adjustable support, one can vary the distance between the carriage and the wheeled machine frame during movement of the machine frame in various parallel paths so that an operator can remove roofing material from the roof while securing the machine frame and the operator to the roof in a safe manner and allowing for precise parallel cuts to be made during removal of roofing material.

An object of the present invention is thus to provide a device for removing roofing materials which has its weight distributed in such a manner that it will be stable and balanced when operating on an inclined surface, and while traversing a roof.

Another object of the present invention is to provide a device for removing roofing materials having a substantially non-weight bearing blade whose leading edge will follow the contour of the roof, but will not damage the wooden surface of the roof.

Another object of the present invention is to provide a device for removing roofing materials which can be powered reliably on inclined surfaces so that there is instant power at all times when operating on the inclined surface of a roof.

Yet another object of the present invention is to provide a device for removing roofing materials that is self-propelled with both forward and reverse power, and having simple, easy-to-operate controls.

Yet another object of the present invention is to provide a device for removing shingles, roofing felt and nails in continuous strips so that the materials may be picked up and disposed of quickly.

Yet another object of the present invention is to provide a device for removing roofing materials, the device having a guide system which secures the device and the human operator to the roof, while traversing of the roof.

Yet another object of the present invention is to provide a device for removing roofing materials, the device having a guide system which assists in moving the device onto or off of a roof.

Yet another object of the present invention is to provide a device for removing roofing materials, the device having dolly wheels which can be used to transport the device from place to place when not in operation and which can engage tracks of a loading ramp so that the device can be easily taken on or off a roof.

Yet another object of the present invention is to provide a device for removing roofing materials, the device having wheels made of slip-resistant material for increased traction on inclined roofs.

Yet another object of the present invention is to provide a device for removing roofing materials that has wheels which allow the device to move laterally on an inclined roof.

BRIEF DESCRIPTION OF THE DRAWINGS

A better understanding of the invention can be had when the detailed description of the preferred embodiments set forth below is considered in conjunction with the drawings, in which.

DETAILED DESCRIPTION OF THE PREFERRED EMBODIMENT

Figure 6:
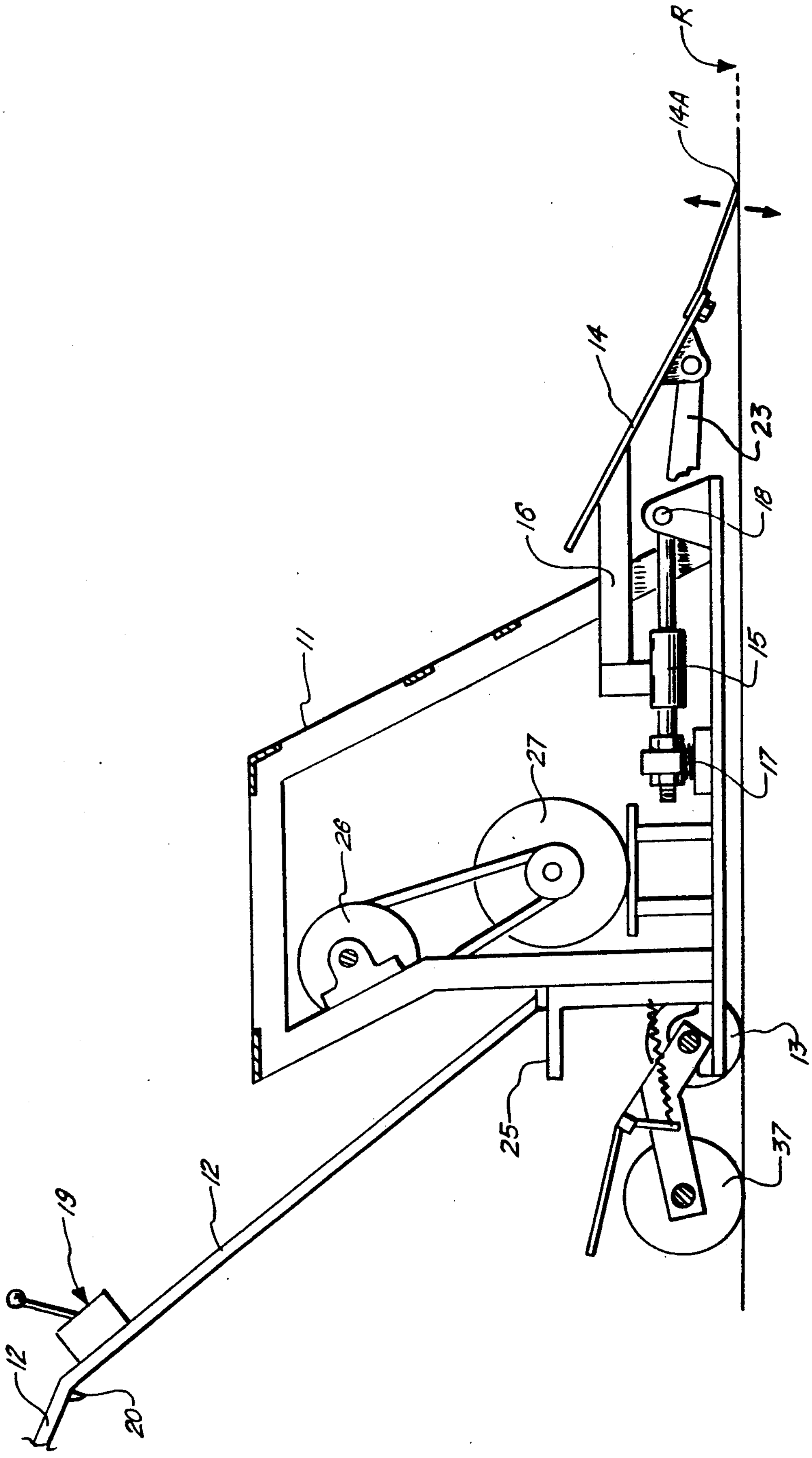
FIG. 6 is a side view illustrating the preferred embodiment of the apparatus of the present invention in operating position with the dolly wheels raised and view of linear bearing connection to the blade.
Figure 7A:
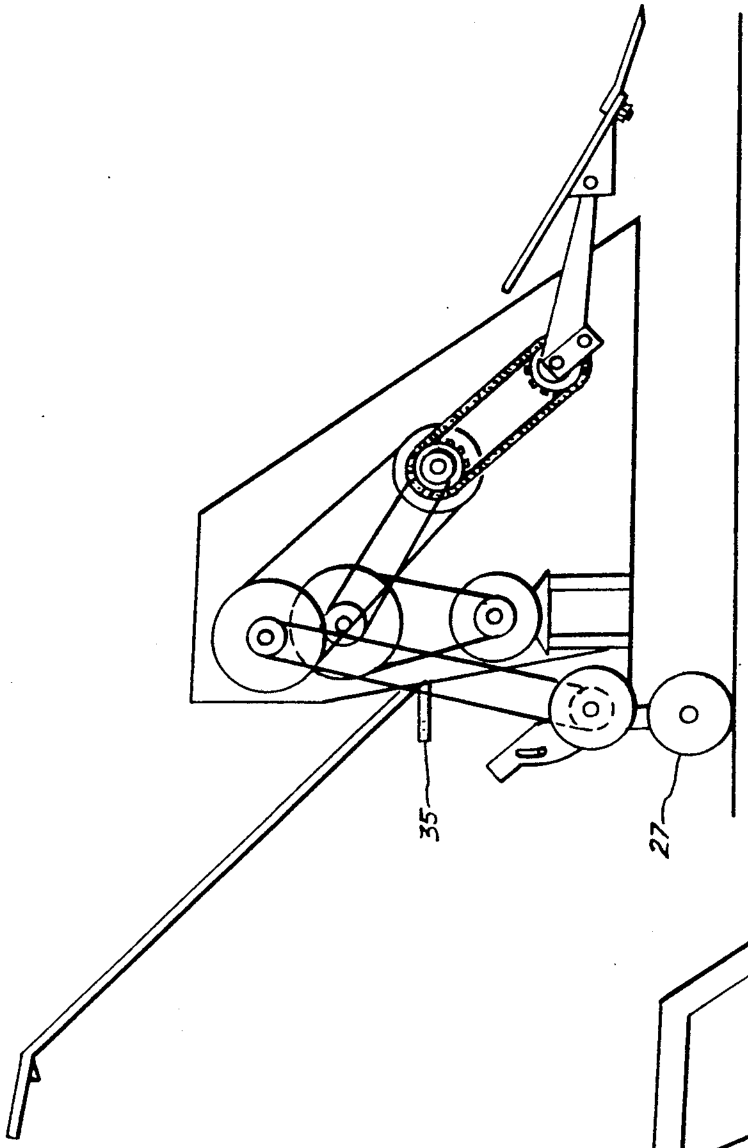
FIGS. 7–7A side fragmentary views of the preferred embodiment of apparatus of the present invention with dolly wheels down and view of the cam shaft connection to the blade.
Figure 7:
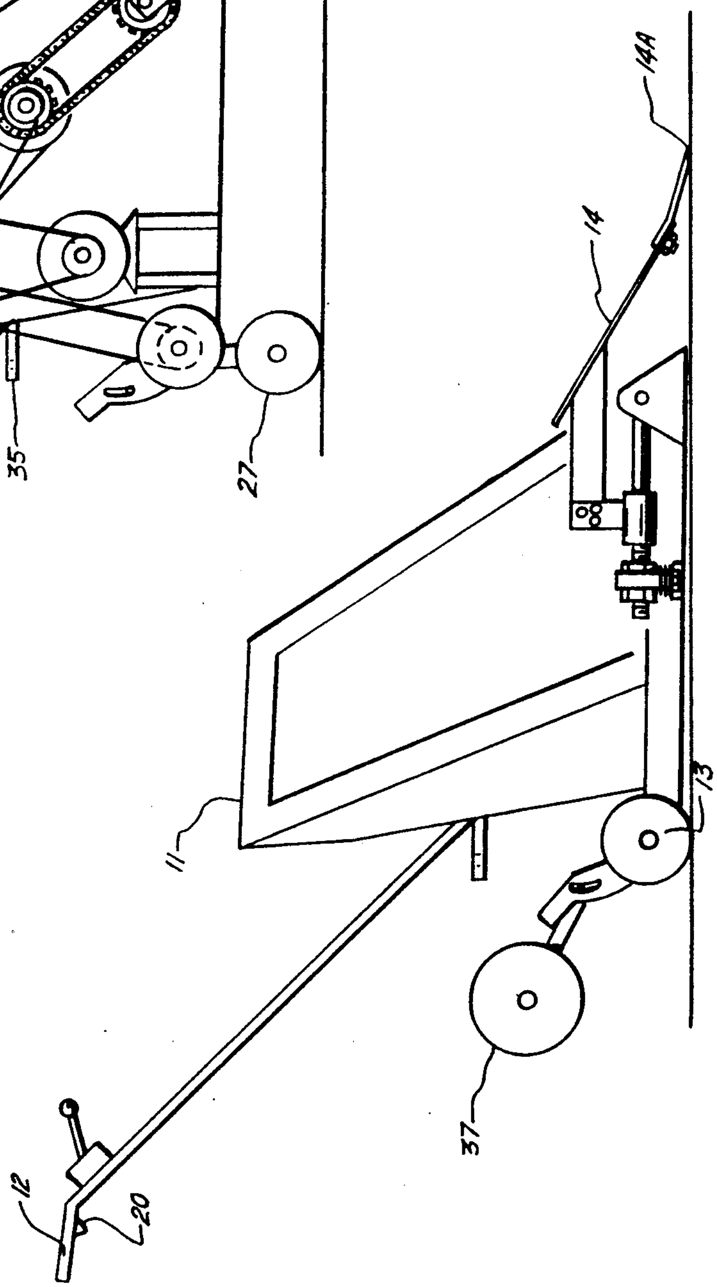
Figure 8:
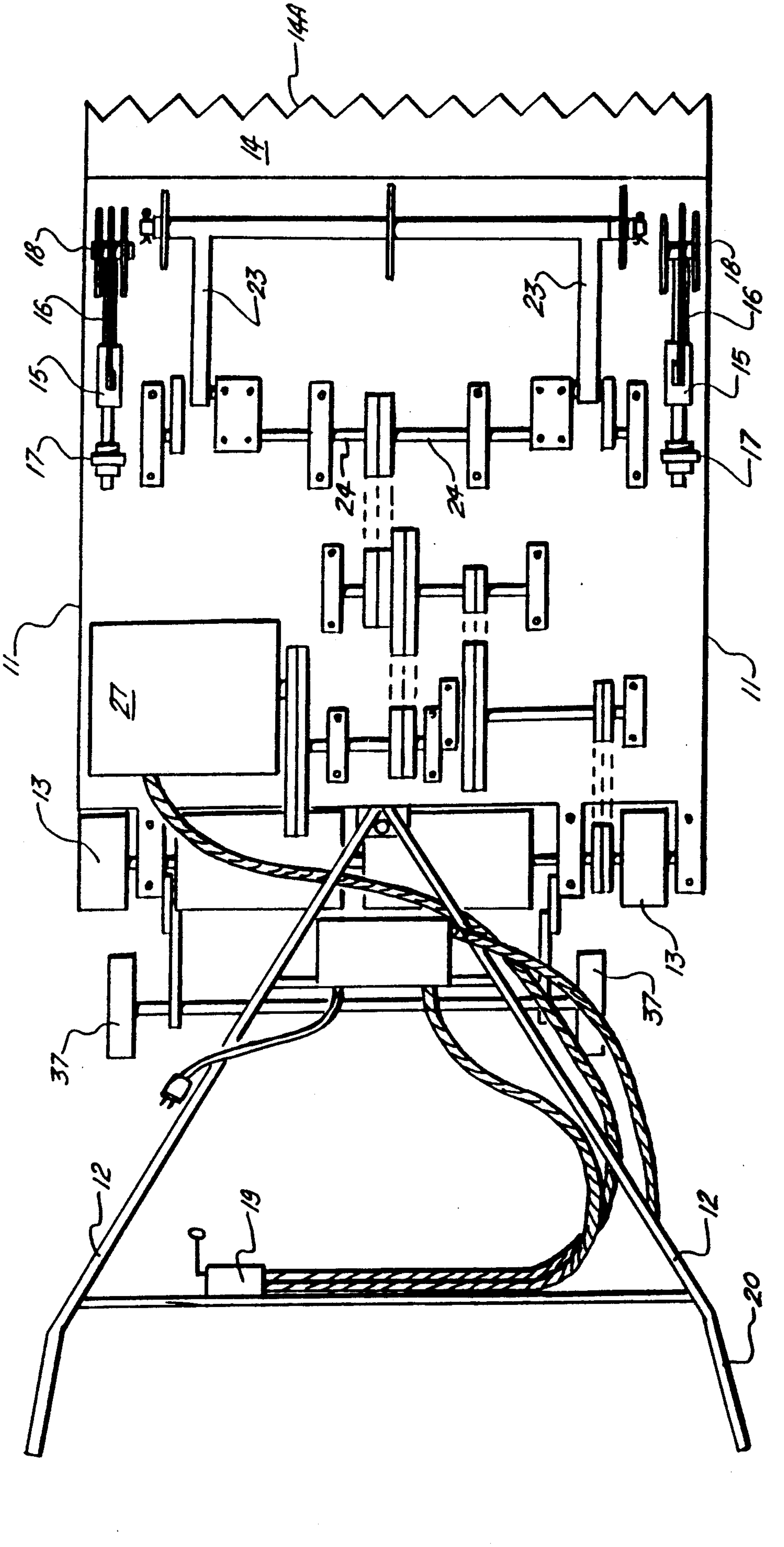
FIG. 8 is a top plan view of the preferred embodiment of the of the present invention.

The present invention provides an improved roofing material scraper apparatus and associated guide system designated generally by the numeral 10 in the drawings. The apparatus includes a frame 11 having handles 12 and a plurality of powered pulling wheels 13. A blade assembly 14 having a serrated forward stripping portion 14A is supported by means of tension bars 15. Linear bearings 16 allow the blade to move fore and aft during a reciprocating motion of the blade. One end portion of the tension bars 15 is mounted upon vertical coil spring assemblies 17 which allow the forward end portion of the blade 14 to move upwardly and downwardly (see FIG. 6) with respect to the roof deck R so that the blade 14 can track the surface of the roof deck R to remove roofing materials including paper, nails and shingles.

Figure 1:
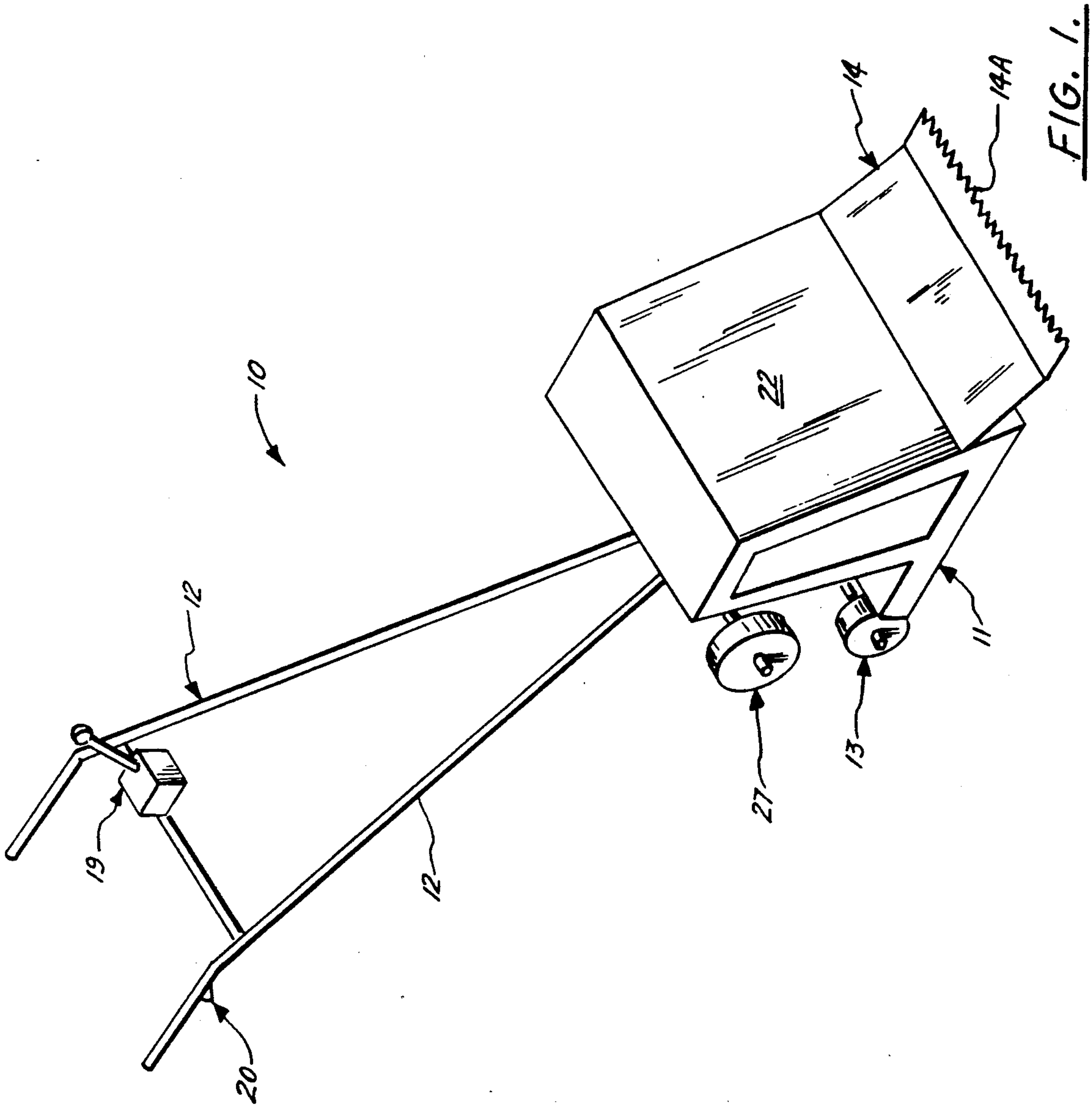
FIG. 1 is a perspective view of the preferred embodiment of the apparatus of the present invention.

Tension bars 15 are pivotally mounted at pins 18. A reversing drum 19 is mounted upon frame 11 adjacent the upper end portion of handles 12. An on-off no-lock trigger squeeze-type safety switch, for example, is designated by the numeral 20 in FIG. 1. This simply allows the apparatus to be shut off should an operator lose his grip upon one of the handles 12. A frame cover 22 prevents debris from fouling moving parts and generally deflects debris away from the working parts of the apparatus 10. The blade 14 is driven by means of a pair of forwardly extending drive arms 23, each mounted to cam shaft 24 which is driven by endless chain 25. Sprockets 26 form connections with electric motor 27 so that rotary power is transmitted to rotate cam shaft 24.

A guide system includes one or more machine cables 28, 29 extending between machine frame 11 and winch carriage 33. One of the machine cables 28, 29 can be in the form of an operator support cable 29 having a safety belt 30 so that the cable 29 can be attached using the belt 30 to a human operator, safely holding his position upon the roof deck surface R. A pair of rotary winches 31, 32 are provided on carriage 33, each respectively controlling the pay out of cables 28, 29. Carriage 33 is wheeled, having a plurality of wheels W, and rides upon track 34. Note that some wheels W have vertical shafts and some have horizontal shafts so that both vertical and lateral force transmitted to the carriage is borne by the track 34. Track 34 is preferably positioned adjacent the roof ridge line RL, and preferably on the opposite surface of the ridge line RL from machine frame 11 so that tension applied to the carriage 33 via lines 28, 29 causes the carriage 33 to bear downwardly against the track assembly 34. Frame 11 carries a gusset connection 35 for attaching cable 28 thereto. A tracking wheel TW follows the ridge line RL.

Figure 2:
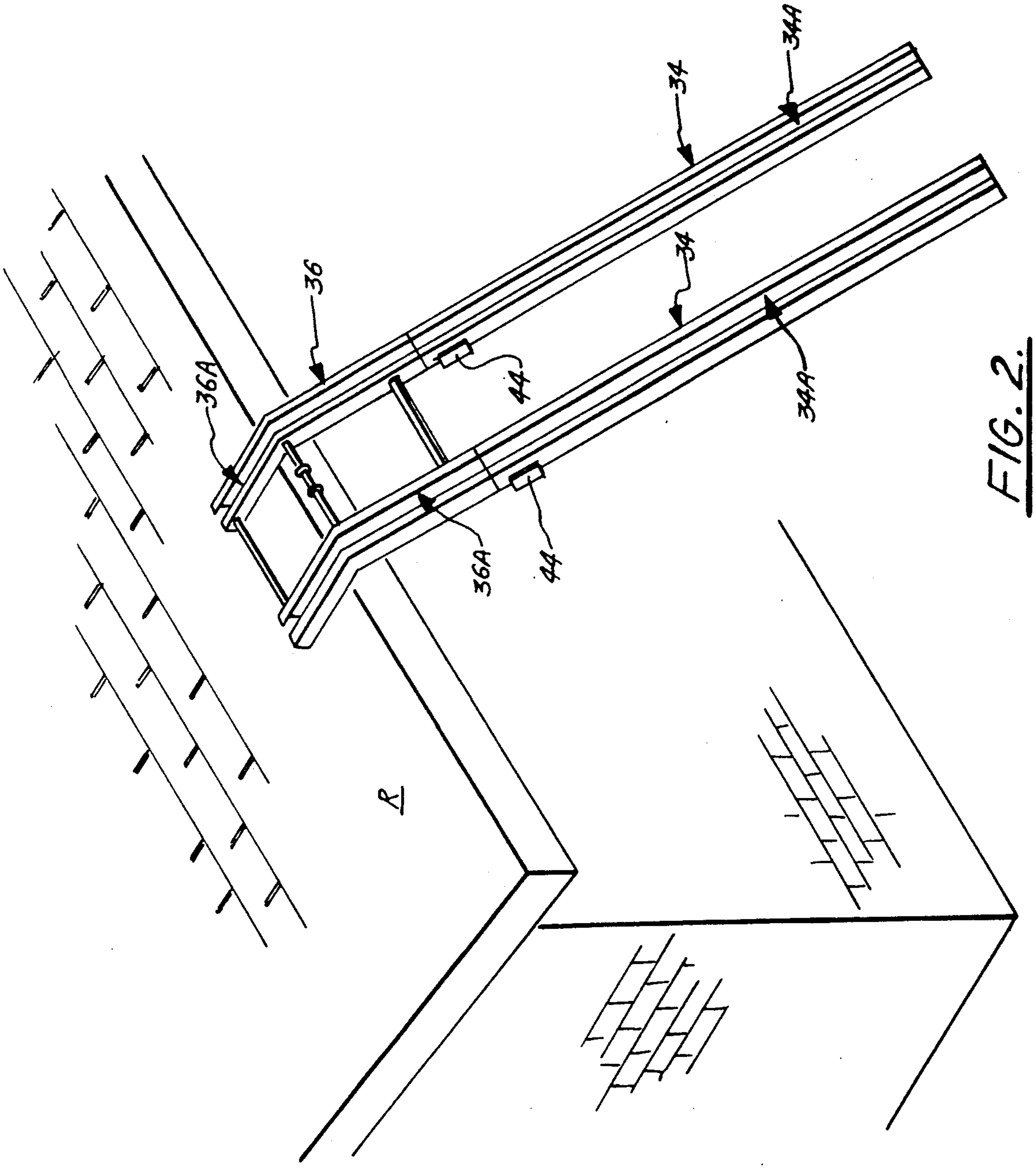
FIG. 2 is a perspective view of the on-off ramp portion of the apparatus of the present invention.
Figure 3:
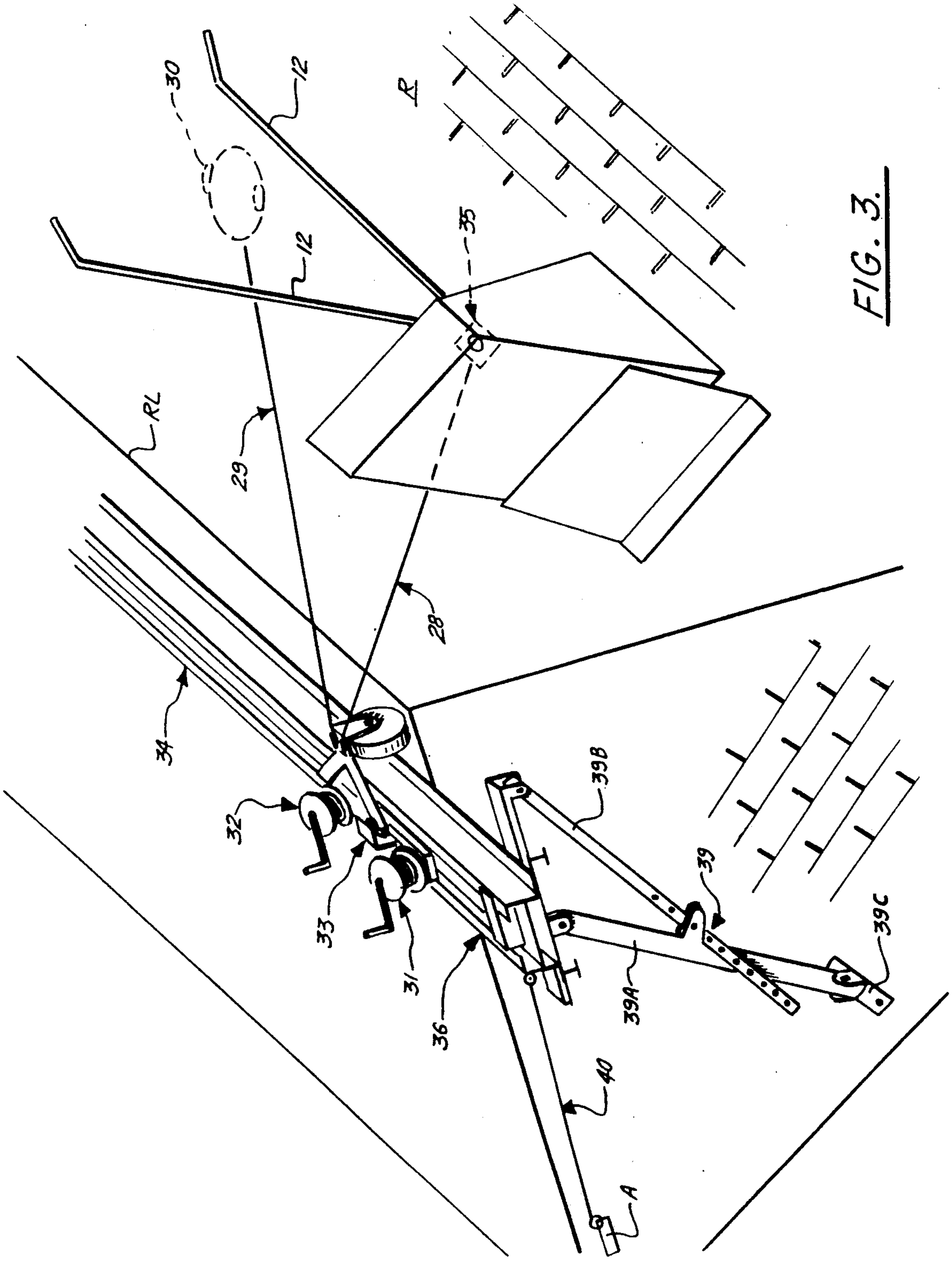
FIG. 3 is a perspective view of the preferred embodiment of the apparatus of the present invention illustrating the guide system.
Figure 9:
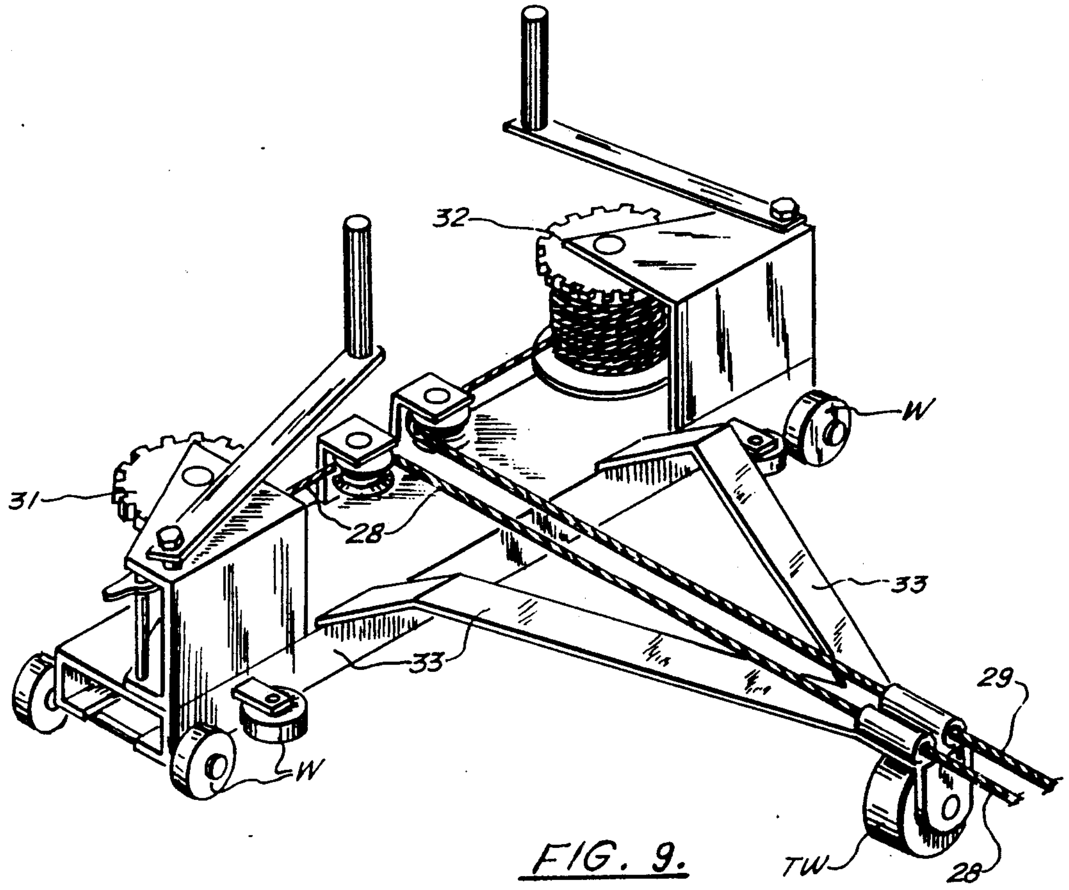
FIG. 9 is a perspective view of the preferred embodiment of the apparatus of the present invention illustrating the carriage portion of the system.

In FIG. 2, there can be seen on-off ramp assembly 36 which forms a connection with two sections of track 34 using latch connectors (also called latch arm handles) 44. Machine frame 11 can be raised to or lowered from the roof surface R, by registering wheels 37 into the slots 36A of on-off ramp 36 and the slot 34A of track sections 34.

Figure 5:
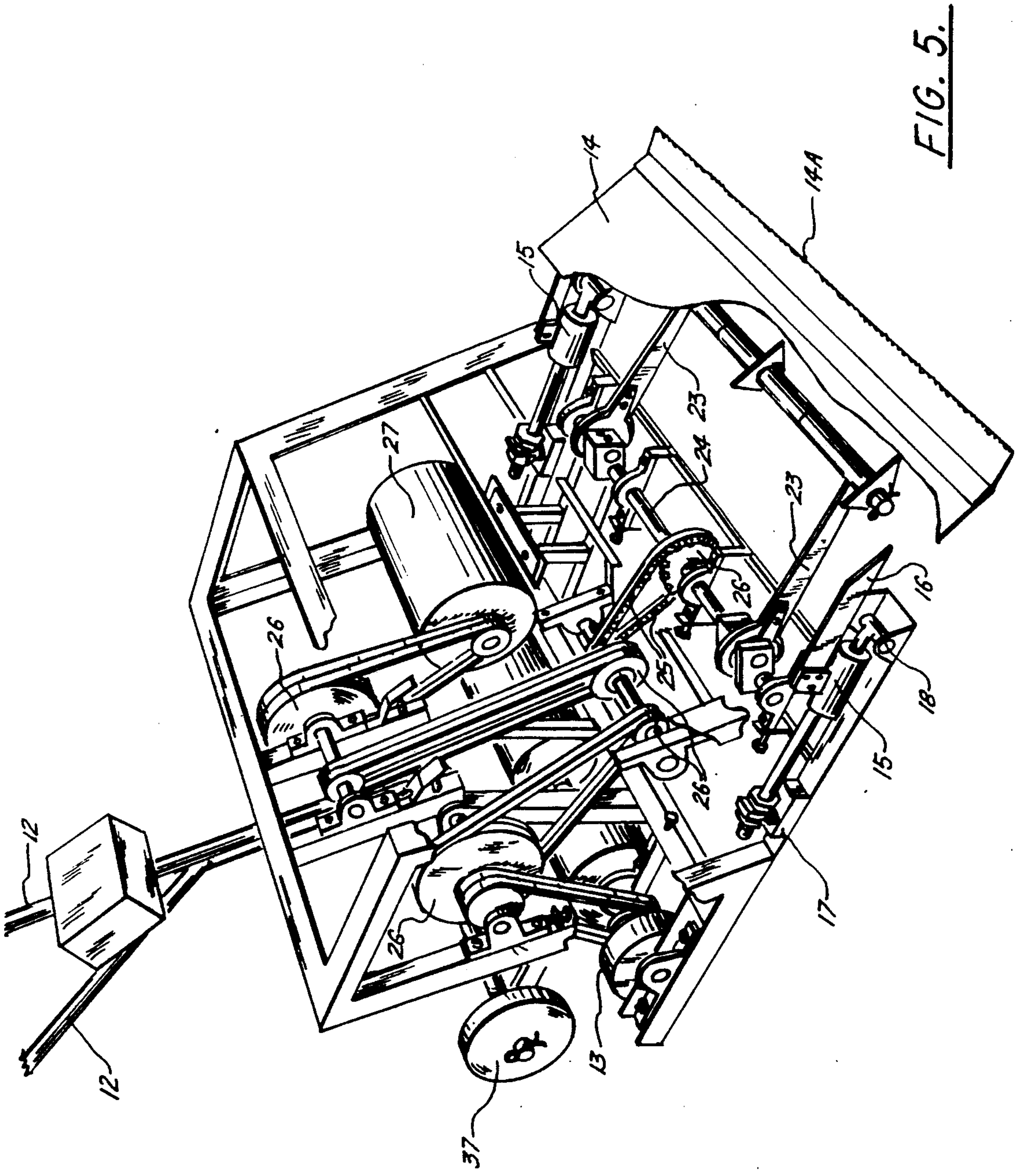
FIG. 5 is a perspective fragmentary view of the preferred embodiment of the apparatus of the present invention.

A pair of rearwardly extending dolly wheels 37 (FIGS. 5 and 6) are provided which aid in moving the apparatus 10 when it is not removing roofing materials from the roof deck R. Track 34 includes at its end portions a stop 38 which prevents the carriage 33 from exiting the end portion of the track 34 during its operation. Otherwise, carriage 33 is free to move between the end portions of the track 34 such as during a traversing of the roof deck R from one end portion to the other end portion of the roof R with the operator moving the machine frame 11 as it rolls upon its support wheels 13.

In this fashion, the cables 28, 29 are normally locked in a fixed linear position with respect to the carriage. This allows the machine frame 11 to basically traverse the roof along lines which are parallel to the track 34. Further, the track 34 would typically be mounted adjacent to and generally parallel to the ridge line RL of the roof so that the parallelism between the machine frame 11 and track 34 is also maintained with respect the ridge line RL. One skilled in the art will recognize that this parallelism causes the machine frame 11 to move along and remove rows of shingles because the rows of shingles are typically parallel to the ridge line of the roof.

Figure 4:
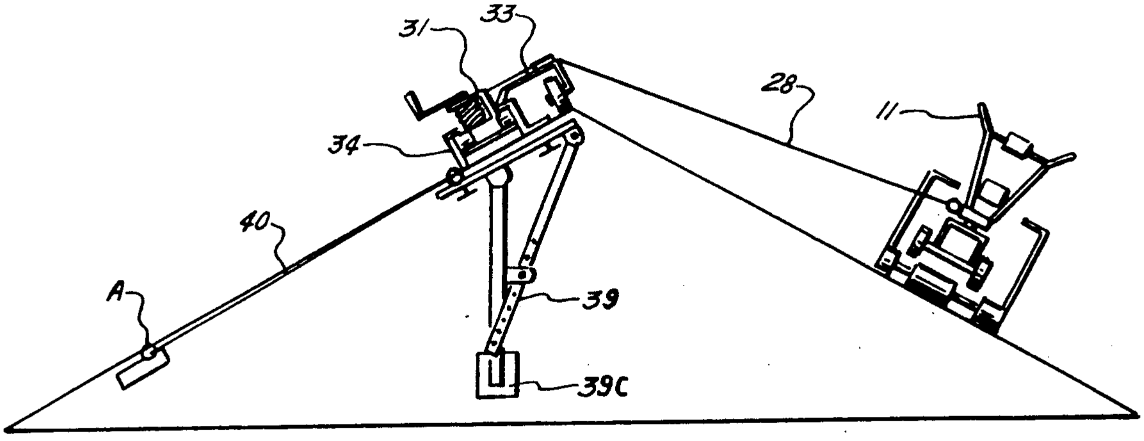
FIG. 4 is an end view of the preferred embodiment of the apparatus of the present invention while in operation on an inclined roof.

Each end portion of track 34 can be supported using an adjustable support bar assembly 39 which is adjustable with regard to elevation and angular orientation of the track 34. The support assembly 39 includes a pair of posts 39A, 39B. Post 39A is typically anchored at pedestal 39C to a section of the roof adjacent the end portions of track 34. Anchor cable 40 extends from track 34 to an anchor position designated by the letter A in FIG. 4 which is spaced away from machine frame 11 during operation and generally on the opposite side of carriage 33 therefrom.

Figure 11:
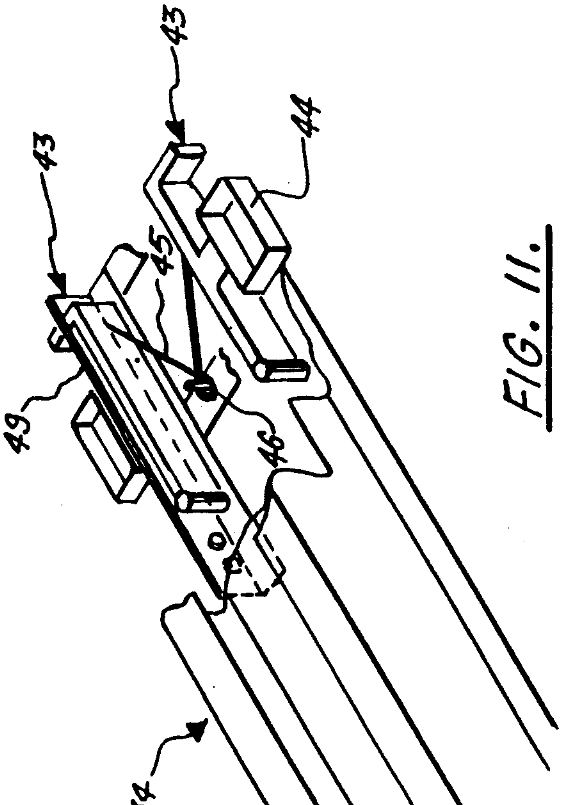
FIG. 11 is a sectional view taken along lines 11—11 of FIG. 10.
Figure 10:
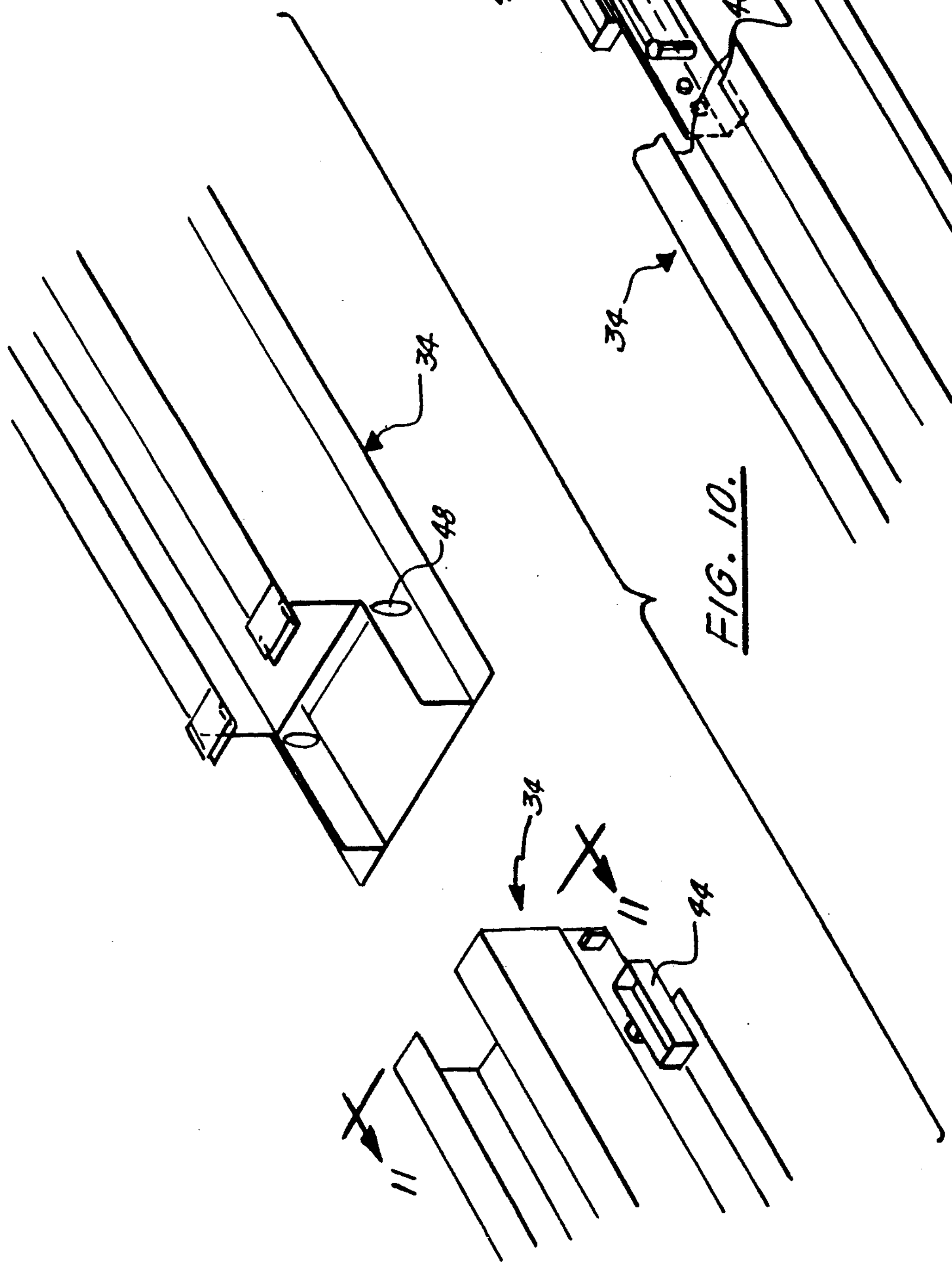
FIG. 10 is a perspective side view of the track portion of t preferred embodiment of the apparatus of the present invention illustrating the track sections and mating connector portions.

FIG. 11 illustrates a connection between track section 34 and latch arm assembly 43 which is inserted into the receiving end of each track section 34 and a latch arm handle 44 which is compressed to and inserted into the end portion of each track engaging slot 48 to complete the connection. Spring 45 is mounted upon spring peg 46.

Thus, the present invention provides an improved roofing material scraper apparatus and guide system 10 which includes a track 34 which defines a path along a roof ridge line RL and generally parallel thereto and adapted to be attached at the ridge line RL of the roof R. The wheeled machine frame 11 can thus traverse the roof R along travel path lines which are generally parallel to and spaced from the track 34. The stripping blade 14 is carried by frame 11 and is provided for removing roofing materials such as shingles, felt, and/or nails as the frame 11 traverses the roof or along the various path lines. The movable carriage 33 is positioned for travel upon the track 34 and carries with it an adjustable support which forms a connection between the carriage 33 and the wheeled machine frame 11. With the adjustable support, one can vary the distance between the carriage 33 and the wheeled machine frame 11 during movement of the machine frame 11 in various parallel paths so that an operator can remove roofing material from the roof R while securing the machine frame and the operator to the roof in a safe manner which also allows for precise parallel cuts to be made during removal of roofing material.

Further, the present invention provides an improved stripping mechanism mounted upon the wheeled frame 11 which includes an angle stripping blade 14 for removing roofing materials including shingles and/or nails which are mounted on at least two reciprocating drive arms 23 at opposite sides of the blade 14. Linear bearings 16 support the blade 14 for translating reciprocating movement of the blade 14 into generally fore and aft movement defining a generally horizontal stripping path. The stripping blade 14 provides a forward end portion which during operation can track the surface of the roof and thus the blade can adjustably conform to the surface of the roof without transmitting excessive weight through the blade on the surface of the blade. The weight of the machine is thus principally borne by the ground bearing wheels 13 and at least part of the frame 11. Vertical coil springs 17 are provided for adjustably supporting the stripping blade 14 and the frame 11 so that the stripping blade 14 can follow the contour of the roof decking. Vertical coil springs 17 attach at one end portion to the tension bars 15. The opposite end portion of the tension bars 15 are pivotally mounted at pins 18 to the machine frame 11 so that as stripping end portion 14A of blade 14 follows the contours of the roof deck R, the springs 17 can adjustably move allowing a pivotal action of the tension bars 15.

A power source preferably in the form of an electric motor 27 propels the frame along a travel path. A reversing drum 19 activates the reversible electric motor to move the machine either in a forward or in a rearward direction as selected by the operator. Such reversing drums are commercially available components and typically nave forward, neutral and reverse positions.

Figure 12:
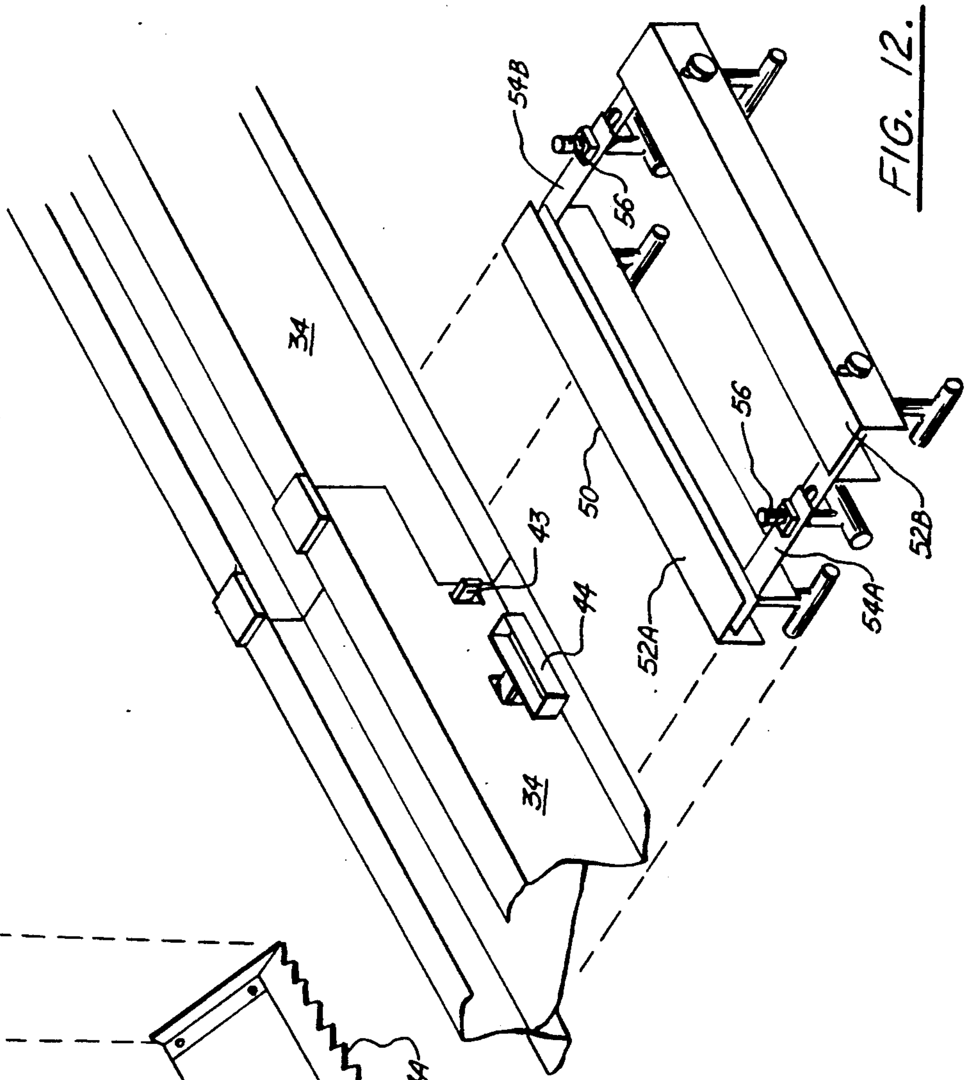
FIGS. 12 is an exploded perspective fragmentary view of the preferred embodiment of the apparatus of the present invention illustrating the track coupling support for track joints.

FIG. 12 illustrates a track coupling support 50 which can be used to support latch connectors 44 when additional sections of track 34 are needed in order to raise on-off ramp 36 to sufficient height to reach the eaves of a building with more than one story. Track coupling support 50 includes opposing clamps 52A,B spaced apart from one another by opposing spacer bars 54A,B. Clamps 52A,B are secured to the base of track 34 by means of turn bolt and nut assemblies 56, or like connectors.

Figure 13:
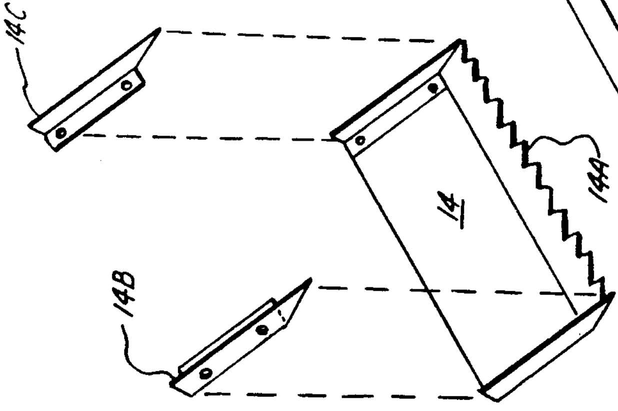
FIG. 13 is a fragmentary perspective view of the preferred embodiment of the apparatus of the present invention illustrating the vertical blade attachments.

FIG. 13 illustrates stripping blade 14 fitted with vertical blades 14B,C to be used when it is necessary to cut through multiple layers of shingles and felt.

Figure 14:
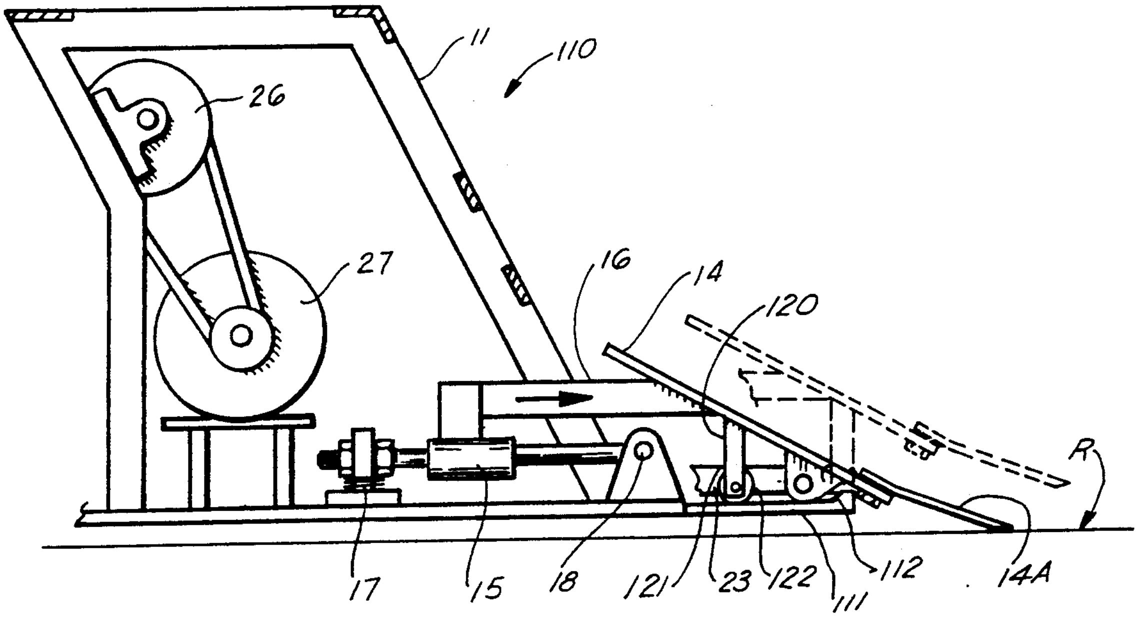
FIG. 14 is a view, similar to that of FIG. 6, of an alternative embodiment of the present invention which includes a track and wheeled-leg system in addition to the components of the preferred embodiment of the present invention.
Figure 15:
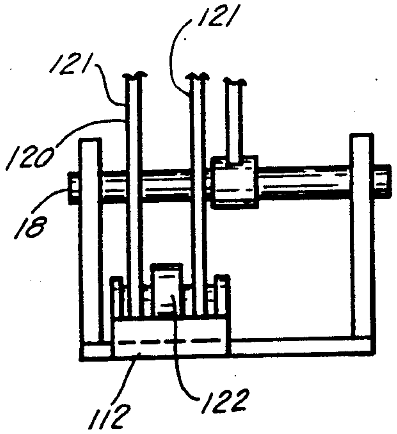
FIG. 15 is a front detail of a track and wheeled-leg of the shown in FIG. 14.
Figure 16:
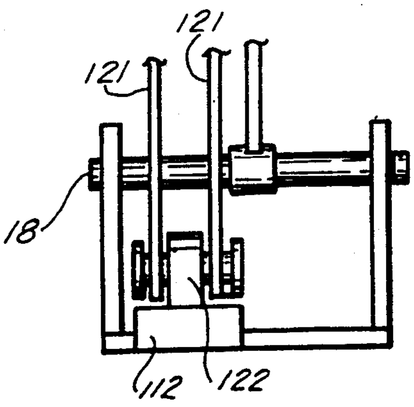
FIG. 16 a view similar to that of FIG. 15 with the the forward end of the track.

An alternative embodiment of the apparatus of the present invention, roofing material scraper apparatus 110, is shown in FIGS. 14, 15 and 16. In addition to the components of the preferred embodiment, apparatus 10, apparatus 110 includes means for facilitating the removal of nails from the roof, namely, tracks 111 and leg assemblies 120. Only one track 11 and one leg assembly 120 are shown in FIGS. 14–16, but there are another similar track and another similar leg assembly on the other side of apparatus 110.

Tracks 111 are welded or otherwise suitably attached to frame 11, and extend horizontally forward of frame 11, below blade 14. Leg assemblies 120 each comprise a pair of legs 121 which are welded o otherwise suitably attached to blade 14. Rotatably mounted between legs 121 is a roller bearing 122. Leg assemblies 120 are aligned such that roller bearings 122 roll along their respective tracks 111.

Blade 14 moves back and forth with the movement of drive arms 23. In apparatus 110, as blade 14 moves back and forth, due to movement of drive arms 23, roller bearings 122 move back and forth along tracks 111. The upper surface of track 111 curves upward at the forward end 112 of track 111. When roller bearing 122 rolls onto the forward end 112 of track 111, blade 14 is forced upward off of roof deck R, pulling up and out of the roof any nails caught in serrated stripping portion 14A. Thus, tracks 111 and leg assemblies 120 act as a means for causing the blade 14 to move perpendicularly relative to the roof to aid in removing nails from the roof. The upper surface of track 111 curves upward adjacent end 112 a sufficient distance (for example, two inches), such that roofing nails are pulled upwardly out of the roof when roller bearings 122 roll onto the surface of tracks 111 adjacent end 112.

In view of the numerous modifications which could be made to the preferred embodiment disclosed herein without departing from the scope or spirit of the present invention, the details herein are to be interpreted as illustrative and not in a limiting sense.

What is claimed as the invention is:

1. A roofing material scraper apparatus and guide system, comprising:

a) track means for defining a path along a roof ridge line and generally parallel thereto;

b) a machine frame that can traverse the roof along travel path lines generally parallel to and spaced from the track means;

c) stripping means carried by the frame for removing roofing materials such as shingles, felt and/or nails as the frame traverses the roof along the travel path lines;

d) a movable carriage positioned for travel upon the track;

e) adjustable support means forming a connection between the carriage and the machine frame for defining an adjustable support that can vary the distance between the carriage and the machine frame during movement of the machine frame.

2. The apparatus of claim 1, wherein the track means and machine frame are positioned on opposite sides of the roof ridge line during operation.

3. The apparatus of claim 2, wherein the movable carriage includes an arm which travels adjacent to the roof ridge and extends above the ridge line and track.

4. The apparatus of claim 3, wherein the arm includes guide means for aligning cables forming connections between the movable carriage, the machine frame and the operator.

5. The apparatus of claim 1, wherein the adjustable support means comprises winch and cable.

6. The apparatus of claim 1, further comprising ramp means connectable to the machine frame which in combination with the adjustable support means can transport the machine frame onto or off the roof.

7. A roofing materials removal device for use by a human operator for removing roof material such as shingles and nails from an underlying roof decking comprising:

a) a frame;

b) an angled stripping blade for removing roofing materials including shingles and/or nails, and mounted on a reciprocating drive arm means;

c) linear bearing means supporting the blade for translating reciprocating movement of the blade into generally fore and aft movement defining a generally horizontal stripping plane;

d) spring means for adjustably supporting the stripping blade so that the stripping blade can follow the contour of the roof decking;

e) power means for propelling the removal device along a travel path.

8. The apparatus of claim 7, wherein the weight of the device is borne principally by wheels and at least part of the frame, not by the stripping blade.

9. The apparatus of claim 7, wherein the power means is an electric motor that both propels the frame forward and reverse and reciprocates the blade.

10. The apparatus of claim 7, further comprising an elongated track attached to the frame and wheels registering with the track for causing the blade to move perpendicularly relative to the roof.

11. The apparatus of claim 7, wherein the power means is a reversible electric motor.

12. The apparatus of claim 11, further comprising means for selectively moving the frame forwardly or rearwardly.

13. The apparatus of claim 12, wherein the selective moving means includes a reversing drum.

14. The apparatus of claim 7, wherein the power means includes multiple sheaves with at least one having double drive belts.

15. The apparatus of claim 7, further comprising multiple sheaves driven by belt assemblies for powering the reciprocating drive arms.

16. The apparatus of claim 7 wherein the reciprocating drive arms are powered at least in part by an endless drive chain.

17. The apparatus of claim 7, further comprising dolly wheel means for elevating the frame during transport such as when the apparatus is not removing roofing materials.

18. The apparatus of claim 7, further comprising safety means for deactivating the power means when the apparatus is inadvertently released by an operator.

19. The apparatus of claim 7, further comprising means for causing the blade to move perpendicularly upward away from the roof a sufficient distance to pull roofing nails upwardly out of the roof.

* * * * *